US007957380B2

(12) United States Patent
Mirtorabi et al.

(10) Patent No.: US 7,957,380 B2
(45) Date of Patent: Jun. 7, 2011

(54) SUPPORT OF UNIDIRECTIONAL LINK IN IS-IS WITHOUT IP ENCAPSULATION AND IN PRESENCE OF UNIDIRECTIONAL RETURN PATH

(75) Inventors: Sina Mirtorabi, Santa Clara, CA (US); Abhay Kumar Roy, Cupertino, CA (US); Lester C. Ginsberg, Mount Hermon, CA (US)

(73) Assignee: Cisco Technology, Inc., San Jose, CA (US)

( * ) Notice: Subject to any disclaimer, the term of this patent is extended or adjusted under 35 U.S.C. 154(b) by 1428 days.

(21) Appl. No.: 11/284,639

(22) Filed: Nov. 21, 2005

(65) Prior Publication Data
US 2007/0115989 A1     May 24, 2007

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2006.01) |

(52) U.S. Cl. ........ 370/392; 370/238; 370/401; 370/221; 370/254; 370/255

(58) Field of Classification Search .................. None
See application file for complete search history.

(56) References Cited

U.S. PATENT DOCUMENTS

| | | | | |
|---|---|---|---|---|
| 6,148,410 | A * | 11/2000 | Baskey et al. | 714/4 |
| 6,477,382 | B1 * | 11/2002 | Mansfield et al. | 455/458 |
| 6,487,605 | B1 * | 11/2002 | Leung | 709/245 |
| 6,614,757 | B1 * | 9/2003 | Rochberger et al. | 370/231 |
| 6,801,496 | B1 * | 10/2004 | Saleh et al. | 370/221 |
| 6,856,591 | B1 * | 2/2005 | Ma et al. | 370/216 |
| 6,888,800 | B1 * | 5/2005 | Johnson et al. | 370/247 |
| 6,950,427 | B1 * | 9/2005 | Zinin | 370/386 |
| 6,985,959 | B1 * | 1/2006 | Lee | 709/238 |
| 7,031,266 | B1 * | 4/2006 | Patel et al. | 370/254 |
| 7,068,712 | B1 * | 6/2006 | Zang et al. | 375/222 |
| 7,227,863 | B1 * | 6/2007 | Leung et al. | 370/390 |
| 7,239,613 | B1 * | 7/2007 | Canning et al. | 370/254 |
| 7,345,991 | B1 * | 3/2008 | Shabtay et al. | 370/221 |
| 7,362,709 | B1 * | 4/2008 | Hui et al. | 370/237 |
| 7,391,730 | B1 * | 6/2008 | Chandra et al. | 370/236 |
| 7,486,610 | B1 * | 2/2009 | Bhupalam et al. | 370/216 |
| 7,639,680 | B1 * | 12/2009 | Roy et al. | 370/389 |

(Continued)

OTHER PUBLICATIONS

Katz, D. "Three-Way Handshake for Intermediate System to Intermediat System Point-to-Point Adjacencies". RFC 3373. Sep. 2002.*

(Continued)

*Primary Examiner* — Daniel J. Ryman
*Assistant Examiner* — Andrew Oh
(74) *Attorney, Agent, or Firm* — Cesari and McKenna, LLP

(57) ABSTRACT

The present invention supports the operation of IS-IS over UDLs without the need for encapsulation of IS-IS PDUs in IP and without the need for a large-scale upgrade of the protocol in the network. The present invention also supports adjacency establishment when the return path from a router at the receive end of a to the router at the transmit end of the unidirectional link is via another unidirectional link.

23 Claims, 2 Drawing Sheets

U.S. PATENT DOCUMENTS

| | | | |
|---|---|---|---|
| 2002/0046271 A1* | 4/2002 | Huang .......................... 709/223 |
| 2002/0067720 A1* | 6/2002 | Garcia-Luna-Aceves et al. ............................ 370/389 |
| 2002/0089980 A1* | 7/2002 | Rombeaut et al. ............ 370/389 |
| 2002/0097726 A1* | 7/2002 | Garcia-Luna-Aceves et al. ......................... 370/395.31 |
| 2003/0031177 A1* | 2/2003 | Robidas et al. ............... 370/392 |
| 2003/0084371 A1* | 5/2003 | Mongazon-Cazavet et al. .............................. 714/13 |
| 2003/0126284 A1* | 7/2003 | Houston et al. ............... 709/238 |
| 2003/0179707 A1* | 9/2003 | Bare ............................. 370/235 |
| 2003/0198228 A1* | 10/2003 | Shen ......................... 370/395.2 |
| 2004/0264364 A1* | 12/2004 | Sato ................................ 370/217 |
| 2005/0028208 A1* | 2/2005 | Ellis et al. ........................ 725/58 |
| 2005/0078610 A1* | 4/2005 | Previdi et al. ................. 370/254 |
| 2005/0088965 A1* | 4/2005 | Atlas et al. .................... 370/216 |
| 2005/0117593 A1* | 6/2005 | Shand ........................... 370/401 |
| 2005/0135357 A1* | 6/2005 | Riegel et al. .................. 370/389 |
| 2005/0141499 A1* | 6/2005 | Ma et al. ....................... 370/389 |
| 2005/0152286 A1* | 7/2005 | Betts et al. .................... 370/255 |
| 2005/0207349 A1* | 9/2005 | Nagami et al. ................ 370/241 |
| 2005/0220054 A1* | 10/2005 | Meier et al. ................... 370/331 |
| 2005/0265346 A1* | 12/2005 | Ho et al. ........................ 370/392 |
| 2006/0062240 A1* | 3/2006 | Meier ............................ 370/448 |
| 2006/0098665 A1* | 5/2006 | Quick ............................ 370/401 |
| 2006/0133266 A1* | 6/2006 | Kim et al. ...................... 370/228 |
| 2007/0047447 A1* | 3/2007 | Mirtorabi et al. ............. 370/238 |
| 2007/0097880 A1* | 5/2007 | Rajsic ............................ 370/254 |

OTHER PUBLICATIONS

Martey, Abe. "Introduction to IS-IS". NANOG 20, Washington DC. 1999.*

* cited by examiner

SUPPORT OF UNIDIRECTIONAL LINK IN IS-IS WITHOUT IP ENCAPSULATION AND IN PRESENCE OF UNIDIRECTIONAL RETURN PATH

FIELD

The present invention broadly relates to communication over public computer networks. Specifically, the present invention relates to unidirectional links conforming to Intermediate System-to-Intermediate System routing protocols.

BACKGROUND OF THE INVENTION

Intermediate System-to-Intermediate System (IS-IS) is a routing protocol developed by the International Standards Organization (ISO). IS-IS is a link-state protocol and behaves much like the Open Shortest Path First (OSPF) protocol. IS-IS was developed as part of the Open System Interconnection (OSI) stack of protocols and uses OSI protocols to deliver packets and establish adjacencies. IS-IS routers need to be assigned OSI addresses, which they use as router identifiers to create network structure. IS-IS has been adapted to carry IP network information, and this form is called Integrated IS-IS. Integrated IS-IS has the most important characteristic necessary in a modern routing protocol: It supports VLSM and converges rapidly. It is also scalable to support very large networks.

IS-IS floods a network with link-state information to build a complete, consistent picture of a network topology. To simplify router design and operation, IS-IS distinguishes between Level 1 and Level 2 ISs. Level 1 ISs communicate with other Level 1 ISs in the same area. Level 2 ISs route between Level 1 areas and form an intradomain routing backbone. Hierarchical routing simplifies backbone design because Level 1 ISs need to know only how to get to the nearest Level 2 IS. The backbone routing protocol can also change without impacting the intra-area routing protocol.

IS-IS uses a single required default metric with a maximum path value of 1024. The metric is arbitrary and typically is assigned by a network administrator. Any single link can have a maximum value of 64, and path links are calculated by summing link values. Maximum metric values were set at these levels to provide the granularity to support various link types while at the same time ensuring that the shortest-path algorithm used for route computation is reasonably efficient. IS-IS also defines three optional metrics (costs): delay, expense, and error. The delay cost metric reflects the amount of delay on the link. The expense cost metric reflects the communications cost associated with using the link. The error cost metric reflects the error rate of the link. IS-IS maintains a mapping of these four metrics to the quality of service (QoS) option in a Connectionless Network Protocol (CLNP) packet header. IS-IS uses these mappings to compute routes through a public network.

IS-IS uses three basic packet formats: IS-IS hello packets, link state packets (LSPs), and sequence number packets (SNPs). Each of the three IS-IS packet types has a complex format that includes an 8-byte fixed header, a packet type-specific portion having a fixed length, and a packet type-specific portion having a variable length.

IS-IS uses type length value (TLV) parameters to carry information in LSPs. These TLVs make IS-IS extendable. IS-IS can therefore carry different kinds of information in LSPs. In an embodiment, IS-IS supports only CLNP. However, IS-IS was extended for IP routing with the registration of TLV 128 that contains a set of 12-octet fields to carry IP information.

In the IS-IS protocol data unit (PDU), there is a fixed part and a variable part of the header. The fixed part of the header contains fields that are always present, and the variable part of the header contains the TLV that permits the flexible encoding of parameters within link state records. These fields are identified by one octet of type (T), one octet of length (L) and "L" octets of value (V). The type field indicates the type of items in the value field. The length field indicates the length of the value field. The value field is the data portion of the packet. Not all router implementations support all TLVs, but they are required to ignore and retransmit the ignored types.

TLV 128 extends IS-IS to carry IP, in addition to connectionless network service (CLNS), routing information in the same packet. Several routing protocols use TLVs to carry a variety of attributes. Cisco Discovery Protocol (CDP), Label Discovery Protocol (LDP), and Border Gateway Protocol (BGP) are examples of protocols that use TLVs. BGP uses TLVs to carry attributes such as Network Layer Reachability Information (NLRI), Multiple Exit Discriminator (MED), and local preference.

There are network deployments where a link is unidirectional (UD) but there is a requirement for routing protocols to forward traffic over it. There is a need to extend routing protocols such as OSPF and IS-IS to run directly over unidirectional links (UDLs).

IP encapsulation is used for tunneling across a communication network of routers. An inner IP header is encapsulated by an outer IP header for the tunneling configuration. The outer IP header is added before the original IP header. Between them are any other headers for the path, such as security headers specific to the tunnel configuration. The outer IP header source and destination identify the endpoints of the tunnel. The inner IP header source and destination identify the original sender and recipient of the datagram. Each header chains to the next using IP Protocol values.

A send-only interface is a router interface that can only transmit. Likewise, a receive-only interface is a router interface that can only receive. The path from receive-only to send-only may be multi hop and can go further through other unidirectional links (UDLs). There is a need to support IS-IS over multi-hop return path without any IP encapsulation and in presence of other UDLs to eliminate the overhead and complexity of IP encapsulation.

SUMMARY OF THE INVENTION

The present invention supports the operation of IS-IS over UDLs without the need for encapsulation of IS-IS PDUs in IP and without the need for a large-scale upgrade of the protocol in the network. The present invention also supports adjacency establishment when the return path from the router at the receive end of a unidirectional link (referred to herein as Router R) to the router at the transmit end of the unidirectional link (referred to herein as Router T) is via another unidirectional link.

The present invention uses TLV information in LSPs to establish adjacencies. The present invention includes three-way handshaking information and MAC address information as sub-TLVs of a new UDL TLV to carry information that is used to establish the adjacency. This supports dynamic creation of adjacencies over a UDL without the need for static configuration of neighbor information.

The present invention uses a return path calculation from router R to router T that does not traverse the UDL between router T and router R to maintain the adjacency from T's perspective. In the absence of some form of encapsulation or tunneling, hellos cannot be sent from router R to router T. Some other mechanism is therefore required in order to detect loss of connectivity on the return path from router R to router T. The present invention utilizes a return path calculation from router R to router T to detect loss of connectivity. This calculation only is required when a topology change occurs in the network. It therefore need only be done in conjunction with a normal event driven SPF calculation.

The present invention uses special flooding rules for UDL-LSPs over a UDL on which no adjacency is yet established. Sending UDL-LSPs periodically over a UDL (even when the link is UP but adjacency is not UP) allows the return path from router R to router T to be via one or more UDLs on which an adjacency may also be in the process of coming up.

The present invention uses LSP TLV information to act as a LAN PSNP equivalent. This, in conjunction with periodic CSNPs, provides reliability to the flooding of LSPs over a UDL by allowing the receive-only router to request LSPs from the transmit-only router when it detects that the two databases are out of synchronization. The likelihood that such synchronization is required is low and therefore delays are defined so as not to unnecessarily utilize this mechanism.

The present invention does not require IP encapsulation nor rely on bidirectional forwarding detection (BFD) to maintain adjacency. The present invention avoids IP encapsulation by performing reverse SPF from receive-only nodes in order to check if there is a path from a receive-only node to a send-only node to maintain the adjacency between the two nodes. Flooding is performed over a UDL in a manner similar to a broadcast circuit where T operates as the DIS and R is not required to send acknowledgements. The present invention also provides support of UDLs in the presence of a UD return path.

The present invention utilizes routers on the receive end of a UDL to reserve at least one LSP fragment other than LSP fragment #0 (at each level if appropriate) for advertising the UDL information described below. An LSP fragment containing one or more UDL TLVs is referred to as a UDL-LSP. The only TLVs that are advertised in these fragments are the UDL TLVs described below and an Authentication TLV (10). This is enforced by the originator of the LSP fragment but is not checked by receiving systems. Routers on the transmit side of a UDL flood UDL-LSPs regardless of the existence of an adjacency in the UP state on that circuit.

Other features and advantages of the present invention will be realized from reading the following detailed description, when considered in conjunction with the drawings, in which:

DETAILED DESCRIPTION

Figure 1:
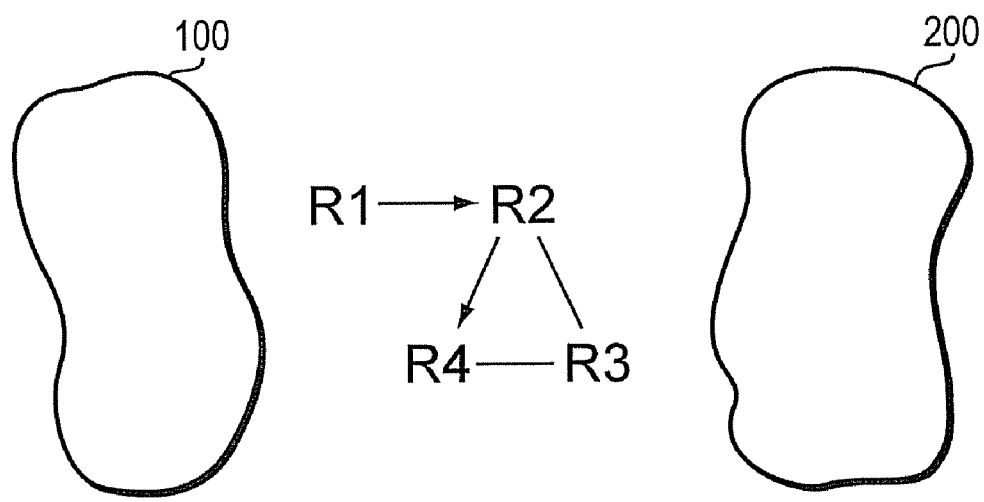
FIG. 1 illustrates a network of routers in accordance with the present invention.

Directing attention to FIG. 1, there is shown an exemplary network of routers in accordance with the present invention. Routers R1-R4 function to pass traffic in the form of packetized data between points 100, 200. Points 100, 200 can be individual, end user computer systems, local area networks, wider area networks, and may even be separate computer networks containing additional routers, but in each case data packets are sent through at least some of the routers R1-R4 between points 100, 200. While FIG. 1 illustrates a network having a specific number of routers R1-R4, it is to be understood that various configurations of routers can be implemented in accordance with the present invention. Such variations include the number of routers included, as well as the communication medium employed between the routers. Routers R1-R4 can communicate with each other over wireless media as well as wired media, as can points 100, 200.

Arrows between routers in FIG. 1 illustrate the presence of a UDL. Lines appearing between routers in FIG. 1 without arrowheads denote bidirectional links.

Figure 2:
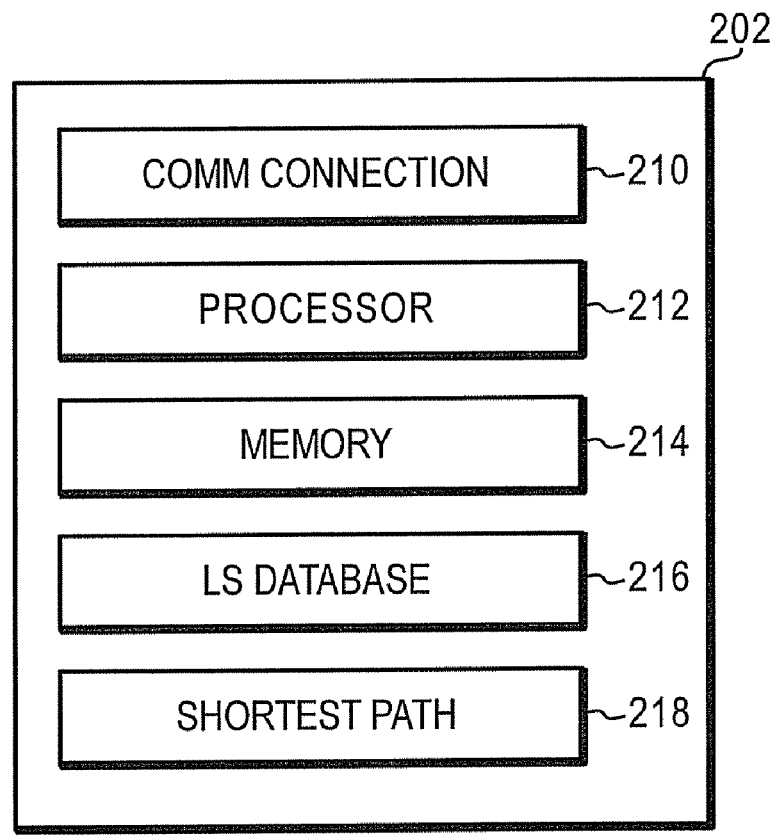
FIG. 2 illustrates in block diagram form the major components of a router in accordance with the present invention.

FIG. 2 illustrates an exemplary embodiment of at least one of routers R1-R4 that incorporate the functionality of the present invention. Router 202 includes communication connection 210, processor 212, memory 214, link state database 216, and shortest path data structure 218. Other components, commonly found in routers known to those skilled in the art, are included in router 202, but are not illustrated.

In accordance with embodiments of the present invention, the following information may appear in a UDL-LSP:

```
x TLV Type - TBD (UDL three-way adjacency
  information)
x Length (8 + ID Length) - 255
x Value - UDL three-way Adjacency Information
  uniquely identifying a neighbor at the
  transmit end of a UDL
  +-----------------------------------+
  | Extended Local Circuit ID         | 4
  +-----------------------------------+
  | Neighbor System ID                | ID Length
  +-----------------------------------+
  | Neighbor Extended Local Circuit ID | 4
  +-----------------------------------+
  SubTLV Type - 6 (UDL LAN Address)
x Length - 6
x Value
  +-----------------------------------+
  | Local LAN Address                 | 6
  +-----------------------------------+
x SubTLV Type - 9 (UDL LSP Entries)
x Length - (10 + ID Length) * N
x Value - A list of N entries of the following
  format
  +-----------------------------------+
  | Remaining Lifetime                | 2
  +-----------------------------------+
  | LSP ID                            | ID Length + 2
  +-----------------------------------+
  | LSP Sequence Number               | 4
  +-----------------------------------+
  | Checksum                          | 2
  +-----------------------------------+
```

Figure 3:
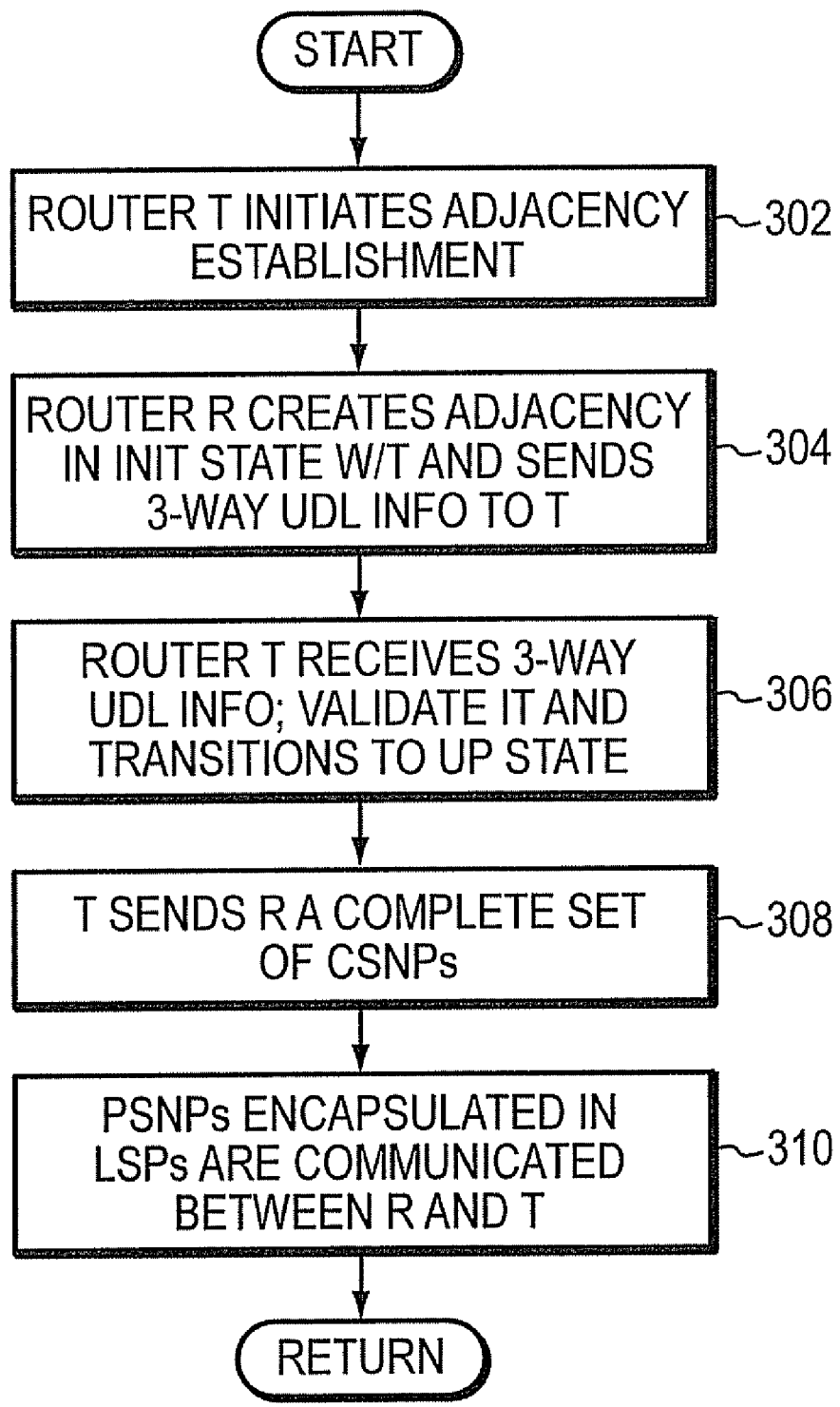
FIG. 3 illustrates in flow chart form a sequence of acts performed in accordance in an embodiment of the present invention.

Router T advertises the cost to its UDL neighbor based on the locally configured value. Router R advertises the cost to its UDL neighbor as the maximum link metric ($2^{24}-1$). This precludes other routers from including the path from router R to router T in their SPF calculations. Directing attention to FIG. 3, at act 302, router T initiates adjacency establishment by sending point-to-point IS-IS hello (IIH) PDUs over the UDL as normal, including three-way Handshake TLV (240). The local circuit ID specified by router T need only be unique among the set of UDL circuits router T is configured to support on which router T is at the transmit end.

At act 304, upon receipt of an IIH PDU, router R creates an adjacency in the INIT state with router T and advertises the existence of the adjacency in its UDL-LSP(s) on the return path to router T through flooding. It sends the three-way UDL information for the neighbor, but no LSP entries. The UDL-LAN address sub-TLV is included if the circuit is a LAN. UDL-LSPs of the appropriate level(s) are generated according to the type of the adjacency with router T. At act 306, when router T receives the LSP fragment(s) from router R containing the UDL three-way adjacency information, it validates the three-way information and transitions its adjacency to UP state. In subsequent IIH PDUs, router T includes router R's circuit ID information as indicated in the UDL three-way TLV in its three-way handshake TLV (240). At act 308, a complete set of complete sequence number packets (CSNPs) is sent to router R and router T propagates its LSP Database to router R for the level(s) appropriate for the type of adjacency. At optional act 310, partial SNPs are communicated between router T and router R.

Router R uses normal adjacency to bring up rules based on the three-way handshake information it receives in IIH PDUs from router T and advertises its IS neighbor to router T in the usual manner i.e. in an LSP fragment other than its UDL-LSP fragment.

For purposes of LSP propagation, router T views the UDL as a broadcast subnetwork where router T is the designated intermediate system (DIS). Therefore, router T propagates new LSPs on the UDL as they arrive but after sending an LSP on the UDL the SRM bit for that LSP is cleared i.e. no acknowledgement for the LSP is required or expected. Router T also sends periodic CSNPs on the UDL.

Router R does not propagate LSPs to router T on the UDL. Router R also does not acknowledge LSPs received from router T on the UDL. In this respect, router R operates on the UDL as a non-DIS on a broadcast circuit. If an LSP entry in a CSNP received from router T identifies an LSP that is newer than an LSP in router R's database, router R may request the LSP from router T by sending a UDL-LSP with an LSP entry as described above. Router R's UDL-LSP will be propagated throughout the network even though the information is only of use to router T. In order to minimize the need for generating new UDL-LSPs, it is recommended that some small delay occur between the receipt of a CSNP from router T and the generation of a UDL-LSP by router R so as to allow for the possible receipt of the LSP either from router T or on another circuit.

On receipt of a UDL-LSP generated by router R, router T checks the three-way adjacency information in each TLV. If the information matches an existing adjacency that router T has with router R then router T sets send routing message flag (SRMflag) on the UDL circuit for any LSPs in its database that are newer than the corresponding entries router R sent in the UDL TLV. UDL information about adjacencies with routers other than router T is ignored by router T.

If all return paths from router R to router T traverse a UDL, then in order to bring up the adjacency between router T and router R, the adjacency on a return path UDL must already be UP. This is required because router T relies on receiving the UDL-LSP generated by router R in order to bring up its adjacency. In order to overcome a circular dependency in the case where multiple pairs of UDL neighbors are trying to bring up an adjacency at the same time, an extension to LSP propagation rules is required. Router T must periodically propagate UDL-LSPs on all UDLs whenever no return path from router R to router T can be calculated by router T (thus there is no adjacency between router R and router T). It is recommended that UDL-LSP(s) be sent at the configured CSNP interval.

Router R must accept and propagate UDL-LSPs received on a UDL even when there is no adjacency in the UP state on the UDL circuit. Flooding of UDL-LSPs by router R uses normal flooding rules. LSPs received by router R on the UDL that do not include UDL TLVs are discarded unless the adjacency is UP (as in normal processing).

Router T sends IIH PDUs as normal. In addition, router T sends periodic CSNPs over the UDL as it would if it were the DIS on a broadcast circuit. As router R cannot send IIH PDUs to router T, router T maintains the adjacency to router R so long as router T has a valid UDL-LSP from router R which includes valid three-way UDL adjacency information regarding the adjacency router R has with router T on this circuit, and router T can calculate a return path rooted at router R back to router T which does not traverse the UDL circuit with which the adjacency is associated. When either of the above conditions is not met, router T brings down its adjacency to router R. Immediately after the adjacency to router R has come up, if the only available return path traverses a UDL circuit on which the adjacency is still in the process of coming UP, the return path check will fail. This is possible because normal flooding rules are suspended to allow the UDL-LSP to be flooded even when the adjacency is not UP on a UDL link. If router T immediately brings the adjacency to router R down in this case, a circular dependency condition arises. To avoid this, if the return path check fails immediately after the adjacency comes up, a timer Tp is started. The timer is cancelled when a return path check succeeds. If the timer expires, router T brings down the adjacency. A recommended value for the timer Tp is a small multiple of the estimated time necessary to propagate LSPs across the entire domain.

Router R maintains its adjacency with router T based on receipt of IIH PDUs from router T as normal. When router R receives a CSNP from router T that contains an SNP entry identifying an LSP fragment which is not in router R's database (including entries which are older than, newer than, or non-existent in router R's database), a timer Tf is started for each fragment. The timer Tf is cancelled if either the associated LSP is received by R on any circuit by normal operation of the Update process, or a subsequent set of CSNPs received from router T does not include the SNP entry. If any timer Tf expires R brings down the adjacency with router T.

In an alternative embodiment, a multi-hop BFD session is established between router T and router R to provide fast failure detection, making optional the calculation described above on T of a return path from router R to router T.

Router T floods UDL-LSPs periodically over all UD links whenever no return path from the router at the receive end of the UDL can be calculated. This extension allows establishment of an adjacency on a UDL even when the return path transits another UDL that is also in the process of bringing up an adjacency. The periodic nature of the flooding is meant to compensate for the unreliability of the flooding. After the adjacency is UP, router R can request LSPs from router T by putting LSP entries into UDL-LSP information—but that ability is not available until the adjacency is UP.

If all return paths from router R to router T traverse another UDL that is also in the process of bringing up an adjacency, it is possible that router T and router R will declare the adjacency between them as UP before a return path is confirmed. This is necessary to avoid a circular dependency. Although it is unorthodox to bring up an adjacency without confirmed two-way connectivity, the extension is well grounded because the receipt of router R's UDL-LSP by router T is indicative of the existence of a return path even though it cannot yet be confirmed by examination of the LSP database. This unconfirmed, two-way connectivity is a condition that is should not be allowed to persist indefinitely—hence the need for timer Tp.

In an alternative embodiment, router R generates and floods a new UDL-LSP each time it receives an IIH from router T over the UDL. This provides a higher degree of confidence that the return path is still functional at the cost of periodic area/domain wide flooding of the new UDL-LSPs. Generation of the UDL-LSPs stops once router R calculates a return path from itself to router T. A timer Tp is used to limit the duration of the periodic flooding.

While preferred embodiments of a method and apparatus for supporting unidirectional links in Intermediate system-to-Intermediate System have been described and illustrated in detail, numerous modifications can be made to the present invention without departing from the spirit thereof. For example, a computer-readable medium may contain instructions which are executed by a computer.

What is claimed is:

1. A method for communicating between a first router and a second router over a unidirectional communication link, the method comprising:
   initiating, by the first router, establishment of an adjacency between the first router and the second router by sending one or more point-to-point intermediate system-to-intermediate system (IS-IS) hello (IIH) messages over the unidirectional communication link, the unidirectional communication link connecting the first router to the second router, the one or more IIH messages containing three-way handshake information to transition the adjacency between the first router and the second router to an INIT state;
   applying a flooding rule to one or more additional unidirectional communication links on a return path between the second router and the first router to cause the one or more additional unidirectional communication links to pass link state packets (LSPs even when an adjacency on the one or more additional unidirectional communication links is not UP;
   receiving, by the first router, one or more LSPs containing three-way handshake information that includes a state of the adjacency between the first router and the second router, and, in response thereto, transitioning the adjacency between the first router and the second router from the INIT state to an UP state; and
   sending, by the first router, to the second router, one or more sequence number packets.

2. The method of claim 1, further comprising the first router sending the second router LSPs stored on the first router.

3. The method of claim 2, further comprising the first router receiving from the second router partial sequence number packets.

4. The method of claim 1, wherein, in one or more IIH messages that the first router sends over the unidirectional communication link to the second router, the first router includes circuit information related to the second router.

5. The method of claim 1, wherein the first router sends at least one LSP to the second router in an action triggered by the first router receiving an LSP.

6. The method of claim 1, further comprising the first router validating the one or more received LSPs containing three-way handshake information.

7. The method of claim 1, wherein the one or more LSPs containing three-way handshake information store the three-way handshake information in a unidirectional communication link (UDL) type length value (TLV) structure of the LSPs.

8. The method of claim 1, wherein the one or more LSPs containing three-way handshake information are LSP fragments.

9. The method of claim 1, wherein the return path is a multi-hop return path between the second router and the first router that does not traverse the unidirectional communication link and the one or more LSPs containing three-way handshake information are received on the multi-hop return path between the second router and the first router that does not traverse the unidirectional communication link.

10. The method of claim 9, wherein the multi-hop return path includes the one or more additional unidirectional communication links.

11. The method of claim 1, further comprising:
    detecting a loss of connectivity on the return path between the second router and the first router by performing a return path calculation from the second router to the first router.

12. The method of claim 11, wherein the return path calculation is a reverse shortest path first (SPF) calculation from the second router to the first router.

13. A method comprising:
    initiating establishment of an adjacency between a first node and a second node by sending one or more hello packets over a unidirectional communication link (UDL), the UDL coupling the first node to the second node, the one or more hello packets containing three-way handshake information;
    applying a flooding rule to one or more additional unidirectional communication links on a return path between the second node and the first node to cause the one or more additional unidirectional communication links to pass link state packets (LSPs) even when an adjacency on the one or more additional unidirectional communication links is not UP;
    receiving, at the first node, one or more LSPs from the second node that include a type length value (TLV) structure containing three-way handshake information at the first node, and in response thereto, transitioning the adjacency between the first node and the second node to an UP state; and
    sending, from the first node to the second node, one or more sequence number packets (SNPs) that include information descriptive of a link state database of the first node.

14. The method of claim 13, wherein the return path is a multi-hop return path between the second node and the first node that does not traverse the unidirectional communication link, and wherein an LSP that includes the TLV structure containing three-way handshake information is received on the multi-hop return path.

15. The method of claim 14, wherein the multi-hop return path includes the one or more additional unidirectional communication links.

16. The method of claim 13, further comprising:
    detecting a loss of connectivity on the return path between the second node and the first node by performing a return path calculation from the second node to the first node.

17. The method of claim 16, wherein the return path calculation is a reverse shortest path first (SPF) calculation from the second node to the first node.

18. The method of claim 13, wherein the one or more LSPs containing three-way handshake information are intermediate system-to-intermediate system (IS-IS) LSP fragments.

19. The method of claim 13 wherein the one or more hello packets are intermediate system-to-intermediate system (IS-IS) hello (IIH) messages.

20. A router, comprising:
    a communications connection; and
    a processor configured to initiate establishment of an adjacency between the router and a second router by sending one or more hello packets over a unidirectional communication link (UDL) to the second router, the one or more hello packets containing three-way handshake information, cause a flooding rule to be applied to one or more additional unidirectional communication links on a return path from the second router to the communication connection of the router, to cause the one or more additional unidirectional communication links to pass link state packets (LSPs) even when an adjacency on the one or more additional unidirectional communication links is not UP, receive one or more LSPs from the second router that include a type length value (TLV) structure containing three-way handshake information, and in response thereto, transitioning the adjacency between the router and the second router to an UP state, and send the second router one or more sequence number packets (SNPs) that include information descriptive of a link state database.

21. The router of claim 20, wherein the return path is a multi-hop return path between the second router and the router that does not traverse the unidirectional communication link, and wherein an LSP that includes the TLV structure containing three-way handshake information is received on the multi-hop return path.

22. The router of claim 20, wherein the one or more LSPs that include the TLV structure containing three-way handshake information are intermediate system-to-intermediate system (IS-IS) LSP fragments.

23. The router of claim 20, wherein the one or more hello packets are intermediate system-to-intermediate system (IS-IS) hello (IIH) messages.

* * * * *